United States Patent
Hui

(10) Patent No.: US 8,189,720 B2
(45) Date of Patent: May 29, 2012

(54) BLIND FREQUENCY-OFFSET ESTIMATION FOR TEMPORALLY AND/OR SPATIALLY CORRELATED SIGNAL

(75) Inventor: Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 745 days.

(21) Appl. No.: 12/275,992

(22) Filed: Nov. 21, 2008

(65) Prior Publication Data

US 2010/0128824 A1   May 27, 2010

(51) Int. Cl.
  *H04L 27/06* (2006.01)
(52) U.S. Cl. ............ 375/344; 375/340; 455/192.1
(58) Field of Classification Search ............ 375/224, 375/340, 344; 455/75, 119, 136, 182.1, 192.1
See application file for complete search history.

(56) References Cited

U.S. PATENT DOCUMENTS

| | | | | |
|---|---|---|---|---|
| 5,475,710 A * | 12/1995 | Ishizu et al. | ............ | 375/232 |
| 6,778,613 B2 * | 8/2004 | Avidor et al. | ............ | 375/329 |
| 7,426,199 B2 * | 9/2008 | Sondur et al. | ............ | 370/332 |
| 7,929,937 B2 * | 4/2011 | Koivunen et al. | ............ | 455/296 |
| 7,990,839 B2 * | 8/2011 | Cimini et al. | ............ | 370/203 |

* cited by examiner

*Primary Examiner* — Jean B Corrielus

(57) ABSTRACT

An iterative, blind, frequency-offset estimation process that does not require any training signal or demodulated information symbols is disclosed. Receivers embodying the disclosed processes can produce periodic frequency-offset estimates, without running computationally intensive equalization or demodulation algorithms, by exploiting the temporal correlation of the received signal in the time domain, as well as the received signal's correlation across in-phase and quadrature dimensions, in some embodiments, to find a frequency-offset estimate that best fits the received signal in a maximum-likelihood sense. In an exemplary method of estimating receiver frequency offset, a temporally stacked signal block is formed from multi-branch signal samples corresponding to each of two or more time-separated samples of the received signal. The temporally stacked signal block is used in computing a maximum-likelihood joint estimate of the receiver frequency offset and the spatial covariance of the temporally stacked signal block de-rotated by the receiver frequency offset.

14 Claims, 4 Drawing Sheets

US 8,189,720 B2

BLIND FREQUENCY-OFFSET ESTIMATION FOR TEMPORALLY AND/OR SPATIALLY CORRELATED SIGNAL

TECHNICAL FIELD

The present invention relates to telecommunication systems, in particular to methods and apparatus for estimating receiver frequency offset in wireless communication receivers.

BACKGROUND

In a cellular communication system, a key task of a mobile terminal is to synchronize its internal reference clock to the carrier frequency of the serving or other nearby base station. Frequency synchronization is needed not only to enable proper reception of the radio signal transmitted from the base station, but also to ensure that the frequency of radio signals emitted from mobile terminal meets tight system specifications, so that substantial interference is not generated for other users.

To maintain a proper frequency reference for its oscillator, a mobile terminal typically performs periodic estimation of the frequency offset, i.e., the deviation of a local reference signal from the actual frequency of the transmitted signal, based on a signal received from a serving or monitored base station. The resulting frequency-offset estimates are used to adjust the reference frequency in the oscillator to keep it from drifting away from the correct designated frequency, to compensate digital signal processing performed on received signals, or both. An efficient algorithm for accurately estimating the frequency offset from the received signal is thus essential to the normal operation of a mobile terminal.

Many conventional frequency estimation algorithms require the receiver to have certain knowledge about the actual transmitted signal, which might be derived either through the use of a pre-determined training signal or through the use of demodulated information symbols in a decision-directed manner. However, in many cases the training signal may be too short for the receiver to derive an accurate frequency-offset estimate, while decision-directed estimation can be computationally expensive and may require the use of specialized hardware accelerator that lacks the flexibility for future design enhancement.

Moreover, many conventional decision-feedback frequency-estimation algorithms treat the baseband received signal as a complex-valued signal, thus treating in-phase and quadrature components of the received signal as the real and imaginary parts, respectively, of a complex-valued signal. These algorithms are generally derived assuming that complex arithmetic operations are used throughout the receiver. As a result, these algorithms are incompatible with receivers that treat the in-phase and quadrature components of the received signal as separate "spatial" dimensions, or branches, and apply more general two-dimensional "spatial" operations on the received signal. For example, a GSM single-antenna interference cancellation (SAIC) receiver typically treats the in-phase and quadrature components of the received signal as though they come from two different antenna elements. The spatial operations involved in such receivers are essential to the interference cancellation capability, but can also significantly distort the phase information of the corresponding complex-valued signal. Consequently, specially designed algorithms are needed for estimating frequency offset in such receivers.

SUMMARY

Various embodiments of the present invention employ an iterative, blind, frequency-offset estimation process that does not require any training signal or demodulated information symbols. As a result, receivers embodying the disclosed processes can produce periodic frequency-offset estimates by monitoring data bursts that may be intended for other users, for example, without running computationally intensive equalization or demodulation algorithms.

The disclosed receivers and processing techniques exploit the temporal (block) correlation of the received signal in the time domain, as well as the received signal's correlation across in-phase and quadrature dimensions, in some embodiments, to find a frequency-offset estimate that best fits the received signal in a maximum-likelihood sense. The temporal (block) correlation of the received signal may arise from channel dispersion, partial-response signaling of the underlying desired signal or a dominant interfering signal, or both, while correlation across in-phase and quadrature components may arise from the presence of a one-dimensional symbol constellation in the received signal, such as with binary phase-shift keying (BPSK) modulation or Gaussian minimum-shift keying (GMSK) modulation.

The disclosed techniques may be applied to any of a variety of multi-branch receiver architectures designed for various cellular systems, including GSM/EDGE systems, single-carrier frequency-division multiple access (SC-FDMA) receivers in 3GPP's Long-Term Evolution (LTE) systems, or other orthogonal frequency-division multiplexing (OFDM) based systems.

Some embodiments of the present invention are based on a complex-valued model of the baseband signal, and thus employ only complex arithmetic operations. Other embodiments are based on a two-dimensional spatial model for the in-phase and quadrature components of the baseband signal, and use two-dimensional matrix operations on the in-phase and quadrature branches. The former embodiments exploit temporal correlations of the received signal, while the latter also exploit the spatial correlation across in-phase and quadrature domains. This latter approach can lead to substantial performance gain when the received signal's modulation constellation is one-dimensional on the in-phase/quadrature plane.

In an exemplary method of estimating receiver frequency offset in a communications receiver, a temporally stacked signal block is formed from multi-branch signal samples corresponding to each of two or more time-separated samples of the received signal. The temporally stacked signal block is used in computing a maximum-likelihood joint estimate of the receiver frequency offset and the spatial covariance of the temporally stacked signal block de-rotated by the receiver frequency offset. In some embodiments, the temporally stacked signal block is generated by forming a vector by stacking complex-valued samples for each branch of the multi-branch signal samples, while in other embodiments the temporally stacked signal block may comprise a vector formed by stacking real-valued in-phase and quadrature samples for each branch of the two or more multi-branch signals.

In some embodiments of the invention, computing a maximum-likelihood joint estimate of the receiver frequency offset and the spatial covariance of the temporally stacked signal block de-rotated by the receiver frequency offset is performed using an iterative process. In some of these embodiments, a de-rotated received signal block is computed from the temporally stacked signal block in each iteration, using a current estimate of the receiver frequency offset. A signal covariance matrix is estimated from the de-rotated received signal block, for each iteration, and the current estimate of the receiver frequency offset is updated as a function of the estimated signal covariance matrix. This iterative process may continue for several iterations until a pre-determined condition is met. For instance, in some embodiments, the process may simply be repeated for a pre-determined maximum number of iterations. In other embodiments, a log-likelihood of the joint estimate of the receiver frequency offset and the spatial covariance may be computed for each iteration, and the iterative process repeated until the incremental change in computed log-likelihoods between successive iterations fall below a pre-determined threshold.

Further embodiments of the present invention include a wireless receiver (which may be embodied in a wireless transceiver configured for operation with one or more wireless standards) that includes one or more processing circuits configured to carry out one or more of the frequency-offset estimation techniques described herein. Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

Figure 1:
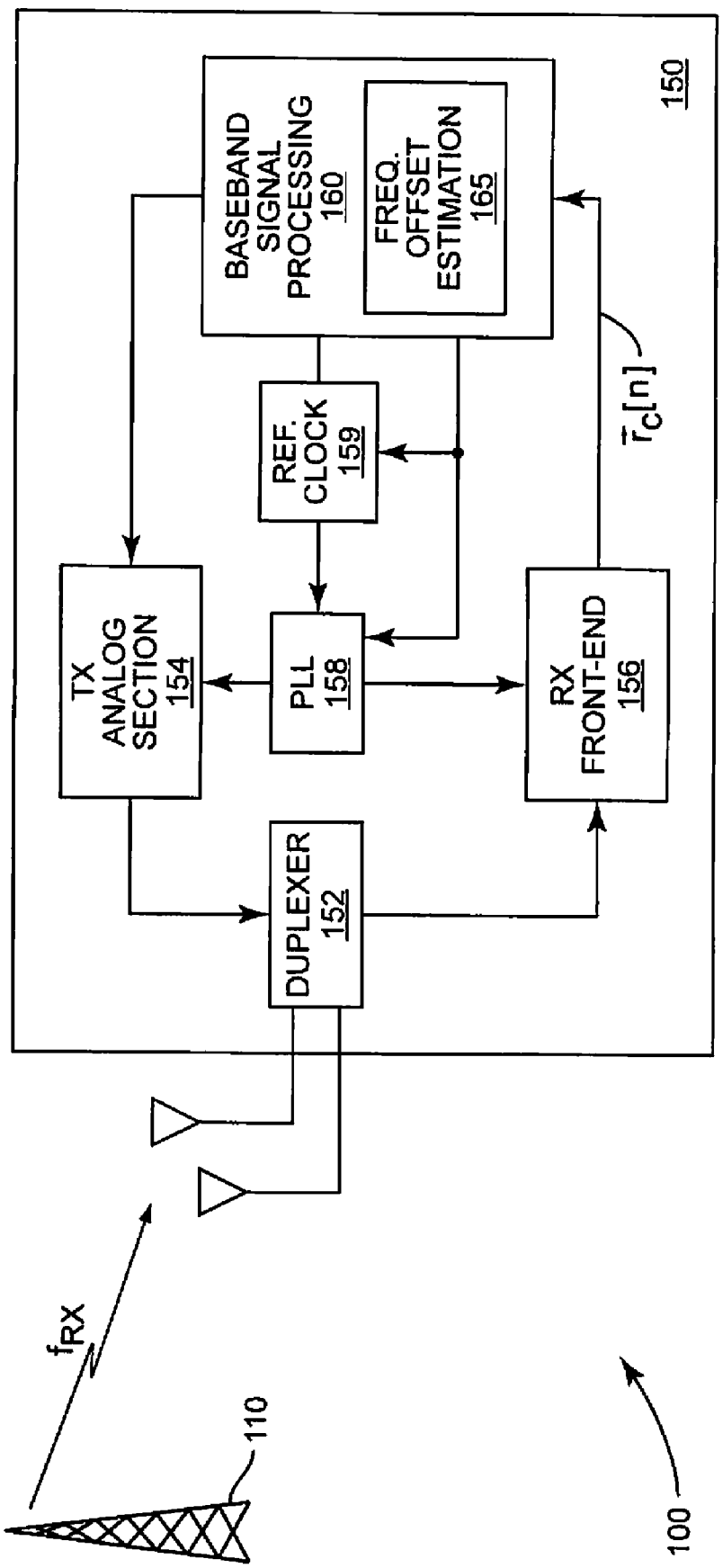
FIG. 1 illustrates a wireless communication system including an exemplary wireless transceiver according to some embodiments of the present invention.

The frequency-offset estimation techniques disclosed herein may be applied to any of a variety of multi-branch receiver architectures designed for various cellular systems, including GSM/EDGE systems, single-carrier frequency-division multiple access (SC-FDMA) receivers in 3GPP's Long-Term Evolution (LTE) systems, or other orthogonal frequency-division multiplexing (OFDM) based systems. Accordingly, FIG. 1 illustrates a simplified block diagram of a wireless system 100, including a base station 110 and wireless transceiver 150. The base station 110 may comprise, for example, a GSM/EDGE base station or an LTE evolved Node B, while wireless transceiver 150 contains wireless receiver circuits and wireless transmitter circuits configured for compatibility with one or more wireless standards and one or more frequency bands, including the wireless standard(s) and frequency band(s) supported by base station 110.

As pictured, exemplary wireless transceiver 150 comprises two receive antennas providing a multi-branch received signal to duplexing circuit 152, which in turn provides the multi-branch received signal to receiver front-end circuit 156. Those skilled in the art will appreciate that duplexer circuit 152 may comprise one or more filters and/or switches, depending on the wireless standard, and serves to alternately connect the antennas to the receiver (RX) front-end circuit 156 and the transmitter (TX) analog section 154, or to isolate signals generated by TX analog section 154 from the RX front-end circuit 156, or both. Those skilled in the art will appreciate that TX analog section 154 and RX front-end circuit 156 may comprise one or more power amplifiers, low-noise amplifiers, filters, mixers, modulators, analog-to-digital converters (ADCs), digital-to-analog converters (DACs), and the like, configured according to well-known techniques appropriate for the wireless standard(s) and frequency band(s) supported by wireless transceiver 150. Accordingly, further details of these circuits, which details are not necessary for an understanding of the present invention, are not provided herein.

TX analog section 154 and RX front-end circuit 156 are supplied with one or more reference signals from phase-locked loop (PLL) circuit 158, which in turn is driven by a reference clock oscillator 159, which may be a temperature-compensated crystal oscillator circuit, for example. Again, design details for various suitable phase-locked loop circuits and reference oscillator circuits are well known to those skilled in the art, and are not provided here.

Baseband signal processing circuit 160, which may comprise one or several microprocessors, microcontrollers, digital signal processors, or the like, configured with appropriate firmware and/or software, supplies a transmit baseband signal (which may comprise, for example, a series of encoded digital samples) to TX analog section 154; TX analog section 154 modulates a reference signal provided by PLL 158 with the transmit baseband signal, up-converts the modulated signal to a radio-frequency (RF) carrier signal frequency, as necessary, and amplifies the RF signal for transmission to base station 110. Baseband signal processing circuit 160 also receives a receiver baseband signal from RX front-end circuit 156, which may comprise, for example, a homodyne or heterodyne downconverter followed by one or more ADCs, and performs demodulation and decoding processes according to conventional techniques.

In the wireless transceiver 150 pictured in FIG. 1, complex-valued, multi-branch, received signal samples $r_c[n]$ are provided by RX front-end circuit 156 to the baseband signal process circuit 160, for use, among other things, by frequency offset estimation circuit 165. In this embodiment, the temporal correlation of the multi-branch signal samples can be exploited, as described in detail below, to estimate the frequency error, or "frequency offset", of the wireless receiver. As will also be described below in reference to FIG. 4, other embodiments may further exploit the spatial correlation between the in-phase and quadrature components of the received signal.

In any event, the reference signals used in wireless transceiver 150 generally must be tightly controlled to match the corresponding frequency sources at the base station 110. This tight control is necessary to ensure that signals transmitted by the wireless transceiver 150 remain within a pre-determined bandwidth, so as to avoid excess interference to other wireless devices. This tight control is also necessary to ensure proper demodulation and decoding of the received signals. Accordingly, baseband signal processing circuit 160 comprises a frequency-offset estimation circuit 165, which is configured to estimate the frequency offset between the frequency references used by wireless transceiver 150 and those used by base station 110, according to one or more of the techniques described herein. Those skilled in the art will appreciate that the term "frequency offset," as used herein, is intended to generally refer to the frequency error in reference signals used in the wireless transceiver 150, as related to the carrier frequency (or frequencies) transmitted by the base station 110 and received by the wireless transceiver 150. Those skilled in the art will appreciate that frequency offsets are commonly expressed as dimensionless relative quantities, e.g., $1 \times 10^{-8}$ or 10 parts-per-billion, that may be applied to any nominal frequency, or in units of frequency, e.g. 100 Hz, as referenced to a particular nominal frequency such as the nominal carrier frequency. However expressed, those skilled in the art will also appreciate that frequency offsets measured by frequency-offset estimation circuit 165 may be used to adjust the reference clock 159 and/or PLL 158, as shown in FIG. 1, and/or to compensate one or more signal processing functions in baseband signal processing circuit 160.

Figure 2:
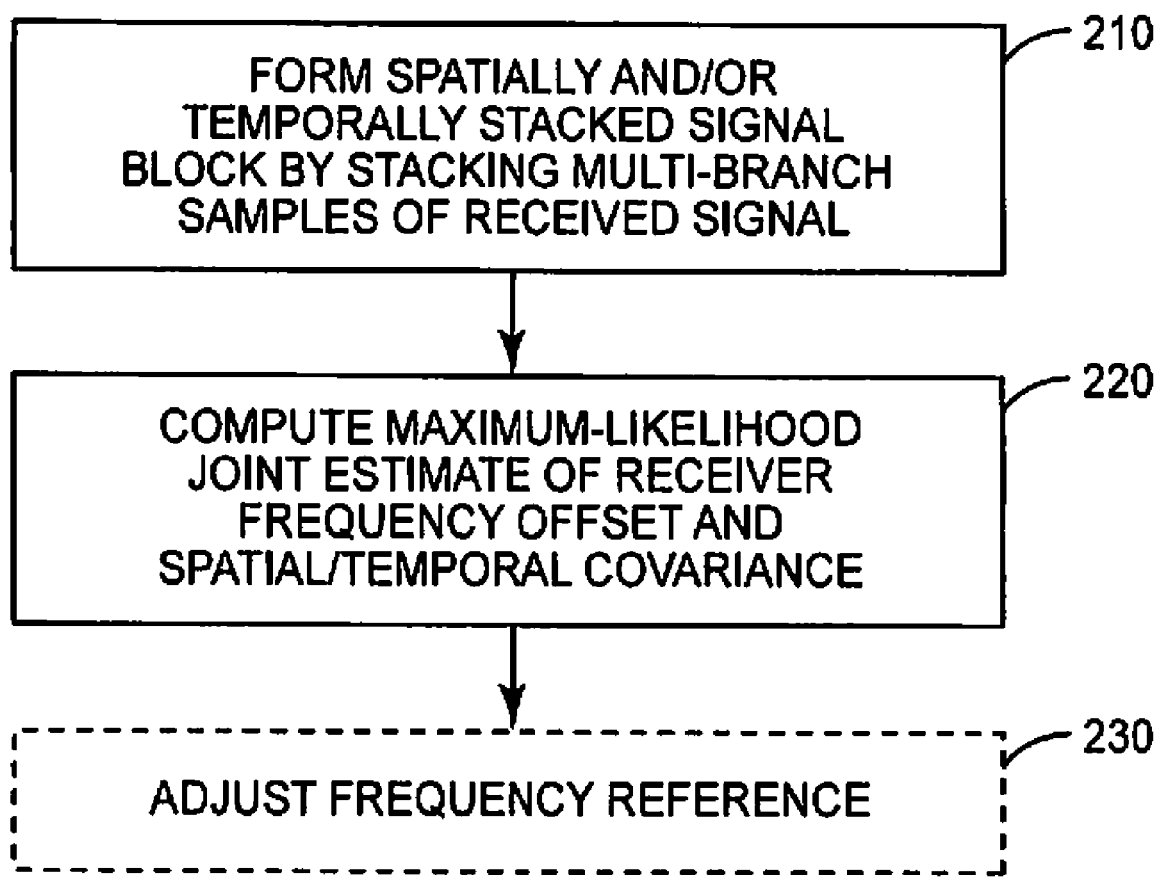
FIG. 2 illustrates an exemplary process flow for estimating receiver frequency offset in a communications receiver.

According to various embodiments of the present invention, frequency-offset estimation circuit 165 is configured to estimate the receiver frequency offset relative to a received signal using the process generally illustrated in FIG. 2. As shown at block 210, a spatially and/or temporally stacked signal block may be formed by stacking two or more time-separated multi-branch samples of the received signal, where the multiple signal branches may result from the use of two or more separate antennas, from multiple sampling phases of an over-sampled signal, or both. As will be explained in considerably more detail below, the temporal and/or spatial correlation of the received signal can be exploited to estimate the frequency offset. In particular, a maximum-likelihood joint estimate of the receiver frequency offset and the spatial/temporal covariance of the temporally stacked signal block, de-rotated by the receiver frequency offset, can be computed, as shown at block 220. In some embodiments of the invention, the estimated receiver frequency offset may be used to adjust a frequency reference, e.g., by adjusting reference clock 159 or PLL circuit 158, or both, as shown at block 230. In some embodiments, the estimated receiver frequency offset may be used to compensate baseband signal processing on the received signal samples, such as by digitally de-rotating one or more digital samples of the received signal. In some embodiments, a combination of these techniques may be used.

Following is a detailed derivation of exemplary formulas for use in estimating frequency offset in a received signal according to several embodiments of the present invention. The derivation below is presented for explanatory purposes, and is not intended to be limiting, as those skilled in the art will appreciate that equivalent formulations and/or minor variations of the formulations presented herein may be used, according to the general techniques described above, to estimate receiver frequency offset in various embodiments of the present invention.

First, consider the following complex-valued baseband model of a multi-branch signal received over a burst of N samples:

$$r_c[n] = \begin{bmatrix} r_{c,1}[n] \\ r_{c,2}[n] \\ \vdots \\ r_{c,N_r}[n] \end{bmatrix} = e^{j\alpha_0(n-n_0)}\{u_c[n] + v_c[n]\}, \quad (1)$$

for n=0, 1, . . . , N−1, where $\alpha_0$ denotes the true (real-valued) relative frequency offset with respect to the baud rate (in radian), $n_0$ denotes a constant index pointing to the middle of a burst, $r_{c,i}[n]$ denotes the i-th received signal branch, $\{u_c[n]\}$ denotes the complex-valued desired signal, and $\{v_c[n]\}$ denotes a complex-valued interference-plus-noise vector process. Note that the multiple signal branches may come from different physical antennas, different sampling phases of an oversampled signal, or both.

Now, let r[n,α] denote the received signal vector de-rotated by a frequency offset of α, i.e.:

$$r[n,\alpha] \equiv e^{-j\alpha(n-n_0)}r_c[n] \quad (2)$$

Also, let:

$$r_M[n,\alpha] \equiv vec([r[n,\alpha],r[n-1,\alpha], \ldots r[n-M,\alpha]]) \quad (3)$$

be the vector formed by stacking $\{r[k,\alpha]\}_{k=n-M}^{n}$ in columns, where M denotes the "model order", and, using MATLAB™ notation, vec(A)≡A(:) for any matrix A. Similarly, let:

$$r_M[n] \equiv vec([r_c[n],r_c[n-1], \ldots r_c[n-M]]) \quad (4)$$

be a vector formed by stacking $\{r_c[k]\}_{k=n-M}^{n}$ in columns; let $$v_M[n] \equiv vec([v_c[n],v_c[n-1,], \ldots v_c[n-M]]) \quad (5)$$

denotes the corresponding stacked noise vector, and let $$u_M[n] \equiv vec([u_c[n],u_c[n-1,], \ldots ,u_c[n-M]]) \quad (6)$$

denote the corresponding stacked desired-signal vector.

For purposes of deriving an estimate of the receiver frequency offset, we assume that the de-rotated received signal vector $r_M[n,\alpha]$ has a complex Gaussian distribution with a mean of zero. Those skilled in the art will recognize that this assumption holds for (at least) Orthogonal Frequency-Division Multiplexing (OFDM) signals, such those used in LTE systems, as well as for signals modulated according to standards for GSM and EDGE. Further, we define a (spatial) covariance matrix:

$$Q \equiv E\{r_M[n,\alpha]r_M[n,\alpha]^H\}. \quad (7)$$

Given the stacked received signal vectors $\{r_M[n]\}_{n=M}^{N-1}$ for the burst of N samples and the preceding assumptions and definitions, the maximum-likelihood joint estimate of the frequency offset α and the spatial covariance matrix Q can be computed. In other words, a frequency offset $\hat{\alpha}_{ML}$ and $\hat{Q}_{ML}$ may be computed to maximize the log-likelihood of the joint estimate, i.e., so that:

$$(\hat{\alpha}_{ML}, \hat{Q}_{ML}) \equiv \underset{(\alpha,Q)}{\mathrm{argmax}}\, ll(\alpha, Q), \quad (8)$$

where:

$$ll(\alpha, Q) \equiv -(N-M)\log\det Q - \sum_{n=M}^{N-1} r_M[n,\alpha]^H Q^{-1} r_M[n,\alpha] \quad (9)$$

$$= -(N-M)\log\det Q - tr\left\{Q^{-1}\sum_{n=M}^{N-1} r_M[n,\alpha]r_M[n,\alpha]^H\right\}$$

is the log-likelihood function of α and Q, given the received signal vectors $\{r_M[n]\}_{n=M}^{N-1}$. (The function tr{A} represents the trace of matrix A, while det A is the determinant of A.)

From Equation (9), it can be shown that the best Q for any given α is given by $$\hat{Q}(\alpha) \equiv \underset{Q}{\mathrm{argmin}}\, ll(\alpha, Q) = \frac{1}{N-M} \sum_{n=M}^{N-1} r_M[n,\alpha]r_M[n,\alpha]^H. \quad (10)$$

For any given Q, if F(Q) denotes a square-root matrix of the inverse of Q, such that $Q^{-1}=F(Q)^H F(Q)$, then the best a for the given Q is given by:

$$\hat{\alpha}(Q) \equiv \underset{\alpha}{\mathrm{argmin}} \sum_{n=M}^{N-1} \|F(Q)r_m[n,\alpha]\|^2, \quad (11)$$

which must satisfy:

$$\sum_{n=M}^{N-1} Re\left\{[F(Q)r_M[n,\alpha]]^H F(Q)\frac{\partial r_M[n,\alpha]}{\partial \alpha}\right\}\bigg|_{\alpha=\alpha(Q)} = 0. \quad (12)$$

where:

$$\frac{\partial r_M[n,\alpha]}{\partial \alpha} = blkdiag(\{j(n-k-n_0)e^{-j\alpha(n-k-n_0)}I_{N_r}\}_{k=0}^{M})r_M[n], \quad (13)$$

in which $blkdiag(\{A_k\}_{k=0}^{M})$ denotes a block diagonal matrix with matrices $\{A_k\}_{k=0}^{M}$ on the diagonal.

The solution of Equation (12) as a function of a does not have a closed form expression in general. However, since the frequency offset (in Hertz) is typically much smaller than the baud rate, then the relative frequency offset α is small, and the rotation $e^{j\theta}$ can be well approximated by the first few terms of its Taylor series expansion given by $$e^{j\theta} = 1 + j\theta - \frac{\theta^2}{2} + \ldots \quad (14)$$

If only the first two terms of Equation (14) are used (i.e., a linear approximation of $e^{j\theta}$), then:

$$r_M[n, \alpha] \cong r_M[n] - j\alpha(K_{n-M}^n \otimes I_{N_r})r_M[n], \quad (15)$$

and $$\frac{\partial r_M[n, \alpha]}{\partial \alpha} \cong [jK_{n-M}^n \otimes I_{N_r} + \alpha(K_{n-M}^n)^2 \otimes I_{N_r}]r_M[n], \quad (16)$$

where $$K_{n-M}^n \equiv \begin{pmatrix} n-n_0 & 0 & \ldots & 0 \\ 0 & n-1-n_0 & \ddots & \vdots \\ \vdots & \ddots & \ddots & 0 \\ 0 & \ldots & 0 & n-M-n_0 \end{pmatrix}. \quad (17)$$

$I_{N_r}$ denotes an $N_r \times N_r$ identity matrix, and $\otimes$ denotes the Kronecker product.

If $$x_M[n] = j(K_{n-M}^n \otimes I_{N_r})r_M[n] \quad (18)$$

and $$z_M[n] = ((K_{n-M}^n)^2 \otimes I_{N_r})r_M[n], \quad (19)$$

then it follows that the necessary condition in Equation (12) reduces to:

$$\hat{\alpha}(Q)^2 \langle x_M[n], z_M[n] \rangle_{Q^{-1}} + \hat{\alpha}(Q)[\|x_M[n]\|_{Q^{-1}}^2 - \langle x_M[n], z_M[n] \rangle_{Q^{-1}}] - \langle r_M[n], x_M[n] \rangle_{Q^{-1}} \cong 0 \quad (20)$$

where $$\langle a[n], b[n] \rangle_{Q^{-1}} \equiv \sum_{n=L+M}^{N-1} a[n]^H F(Q)^H F(Q) b[n] = \sum_{n=L+M}^{N-1} a[n]^H Q^{-1} b[n] \quad (21)$$

and $$\|a[n]\|_{Q^{-1}}^2 \equiv \langle a[n], a[n] \rangle_{Q^{-1}}.$$

Solving Equation (20) yields:

$$\hat{\alpha}(Q) \cong \frac{\langle x_M[n], z_M[n] \rangle_{Q^{-1}}}{2\langle x_M[n], z_M[n] \rangle_{Q^{-1}}} \left[ \sqrt{1 + \frac{4\langle x_M[n], z_M[n] \rangle_{Q^{-1}} \langle r_M[n], x_M[n] \rangle_{Q^{-1}}}{\left(\frac{\|x_M[n]\|_{Q^{-1}}^2 -}{\langle x_M[n], z_M[n] \rangle_{Q^{-1}}}\right)^2}} - 1 \right]. \quad (22)$$

(Note that the other root of Equation (20) violates the assumption of small α.)

Using the approximation $\sqrt{1+x} \approx 1+(\frac{1}{2})x$, Equation (22) simplifies to:

$$\hat{\alpha}(Q) \cong \frac{\langle r_M[n], x_M[n] \rangle_{Q^{-1}}}{\langle x_M[n], z_M[n] \rangle_{Q^{-1}}}. \quad (23)$$

Figure 3:
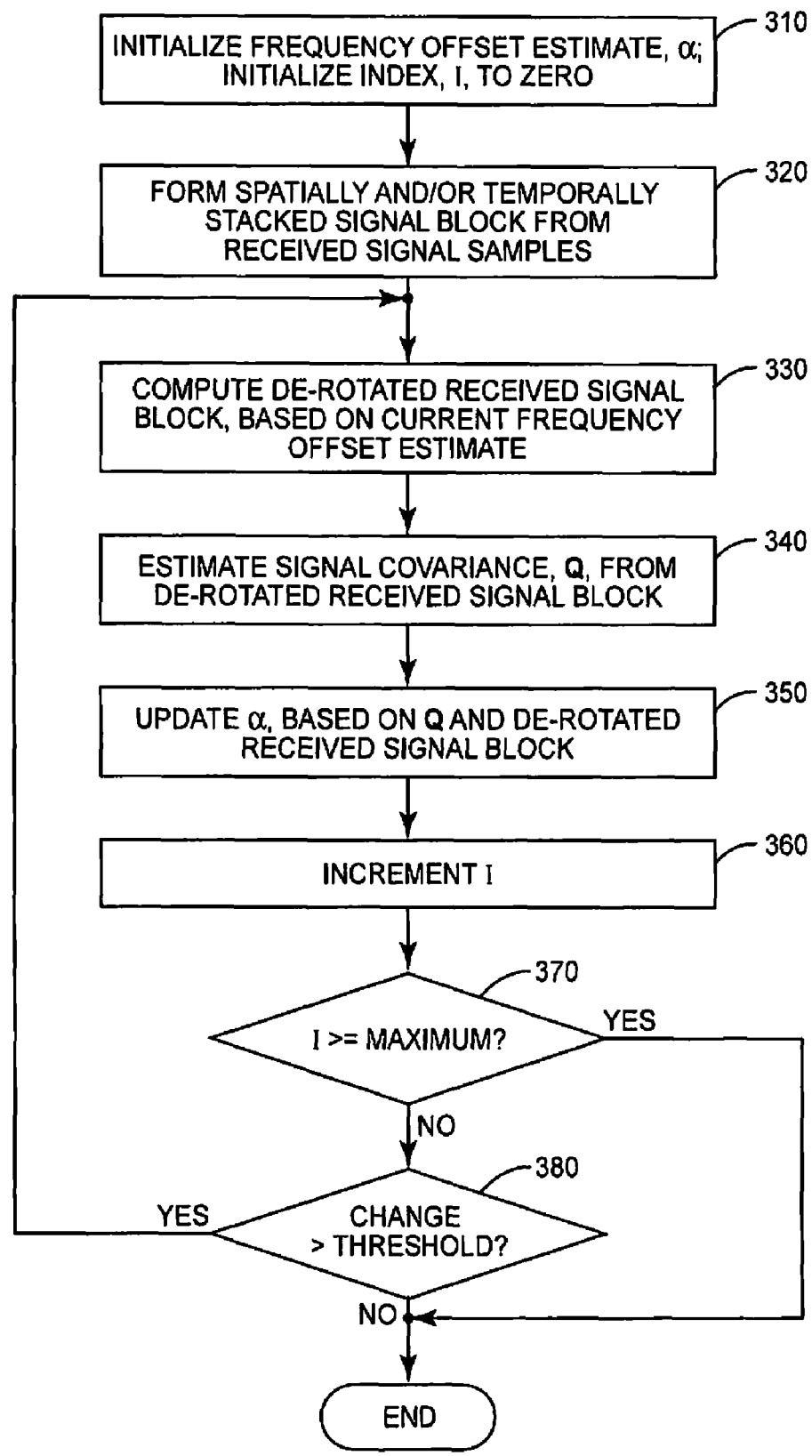
FIG. 3 is another process flow diagram illustrating a method for estimating receiver frequency offset according to some embodiments of the present invention.

Those skilled in the art will appreciate that the formulation in Equation (10), which provides the best Q for any given α, may be used along with either Equation (22) or (23), which provide the best α for a given Q, in an iterative manner to compute an approximate maximum-likelihood estimate of the frequency offset. This approach is generally illustrated in the process flow diagram of FIG. 3, which may be implemented, for example, using one or more processing circuits in a wireless device, such as the baseband signal processing circuits 160 pictured in the wireless transceiver 150 of FIG. 1.

The illustrated process begins with the initialization of a frequency-offset estimate $\hat{\alpha}^{(0)}$ and iteration index i=0, as shown at block 310. In some embodiments, $\hat{\alpha}^{(0)}$ may be initialized at zero if no prior information about the frequency offset is known. In other embodiments, a prior frequency-offset estimate derived from a distinct estimation process, such as a coarse frequency-offset estimation process, may be used as an initial estimate for the frequency offset. In some embodiments, the output from a previous blind estimation using the techniques described herein may be used to initialize the frequency-offset estimate for a subsequent blind estimation process.

In any event, the process continues, as shown at block 320, with the generation of a spatially and temporally stacked signal block formed by stacking two or more (M+1, where M is a positive integer) multi-branch signal samples from a received burst. Using the notation adopted above, the spatially stacked signal block may be given by:

$$r_M[n] = \text{vec}(r_c[n], r_c[n-1], \ldots, r_c[n-M]). \quad (24)$$

A de-rotated received signal block is then computed, as shown at block 330, from the stacked signal block and the current frequency-offset estimate. Using the notation from the previous discussion, the de-rotated received signal block is given by:

$$r_M[n, \hat{\alpha}^{(i)}] = [\text{diag}(e^{-(i)(n-n_0)}, e^{-(i)(n-1-n_0)}, \ldots, e^{-(i)(n-M-n_0)}) \otimes I_{N_r}]r_M[n]. \quad (25)$$

An estimate of the signal covariance matrix Q is then calculated directly from the de-rotated received signal block, as shown at block 340. In particular, given a series of de-rotated received signal blocks corresponding to samples M . . . N−1 of the received signal, this estimate may be calculated according to:

$$\hat{Q}^{(i)} = \frac{1}{N-M} \sum_{n=M}^{N-1} r_M[n, \hat{\alpha}^{(i)}] r_M[n, \hat{\alpha}^{(i)}]^H, \quad (26)$$

and represents the best estimate of Q given the current estimate $\hat{\alpha}^{(i)}$ for the frequency offset.

As shown at block 350, the current estimate of Q, i.e., $\hat{Q}^{(i)}$, is then used to update the frequency-offset estimate. As shown above, in some embodiments this may be done by first calculating $$x_M[n] = j(K_{n-M}^n \otimes I_{N_r})r_M[n] \quad (27)$$

and $$z_M[n] = ((K_{n-M}^n)^2 \otimes I_{N_r})r_M[n], \quad (28)$$

and then using one of the approximations for $\hat{\alpha}^{(i)}$ given above, i.e., $$\hat{\alpha}^{(i+1)} = \frac{\langle r_M[n], x_M[n]\rangle_{(Q^{(i)})^{-1}}}{\langle x_M[n], z_M[n]\rangle_{(Q^{(i)})^{-1}}} \quad (29)$$

or $$\hat{\alpha}^{(i+1)} = \frac{\|x_M[n]\|^2_{(Q^{(i)})^{-1}} - \langle x_M[n], z_M[n]\rangle_{(Q^{(i)})^{-1}}}{2\langle x_M[n], z_M[n]\rangle_{(Q^{(i)})^{-1}}} \left[ \sqrt{1 + \frac{4\langle x_M[n], z_M[n]\rangle_{(Q^{(i)})^{-1}} \langle r_M[n], x_M[n]\rangle_{(Q^{(i)})^{-1}}}{\left(\|x_M[n]\|^2_{(Q^{(i)})^{-1}} - \langle x_M[n], z_M[n]\rangle_{(Q^{(i)})^{-1}}\right)^2}} - 1 \right]. \quad (30)$$

Of course, those skilled in the art will appreciate that other approximations of the general formulation for $\hat{\alpha}^{(i)}$ given in Equation (11) above may be used, in some embodiments.

The estimates for Q and α may be repeated, thus converging upon the maximum-likelihood values for each, until a pre-determined criteria is satisfied. In some embodiments, this criteria may simply be the completion of a pre-determined maximum number of iterations, as shown at blocks 360 and 370. In some embodiments, the iteration may be terminated when an incremental change from one iteration to the next is smaller than a pre-determined threshold, as shown at block 380. For instance, a log-likelihood value may be computed for each iteration according to Equation (9), if the change from one iteration to the next is smaller than a pre-determined threshold, then the process is terminated. Otherwise, the iteration index i is incremented and the updating process is repeated.

As noted above, some receivers treat the in-phase and quadrature components of a received signal as separate "spatial" dimensions, or branches, and apply more general two-dimensional "spatial" operations on the received signal. The techniques described above may be modified slightly to accommodate the separate handling of the in-phase and quadrature components. As will be appreciated by those skilled in the art, this approach exploits the spatial correlation across in-phase and quadrature domains in addition to the temporal correlations between successive samples. Thus, substantial performance gains can be realized when the received signal's modulation constellation is one-dimensional on the in-phase/quadrature plane.

Figure 4:
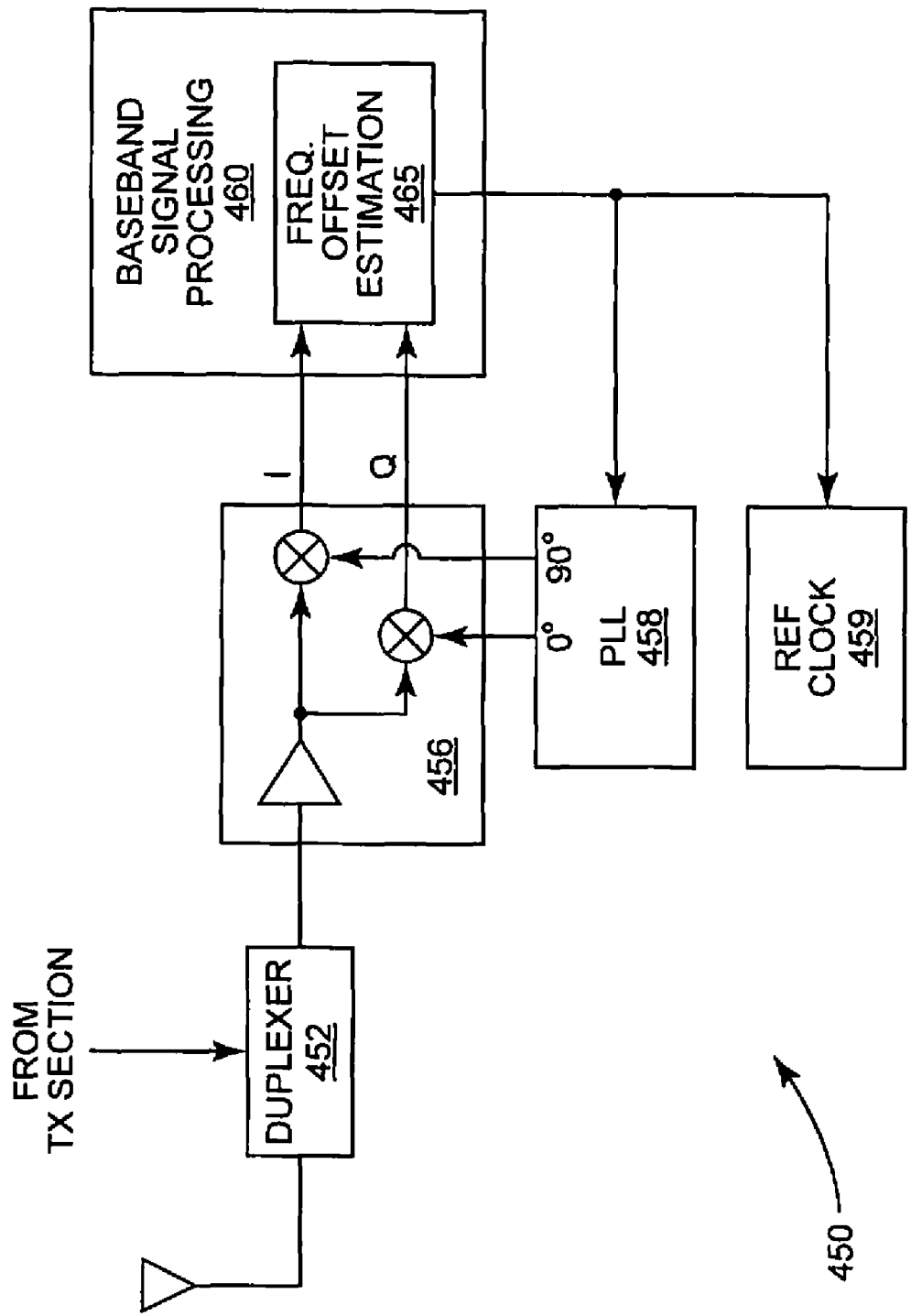
FIG. 4 illustrates details of another exemplary wireless transceiver according to some embodiments of the present invention.

Accordingly, FIG. 4 illustrates a simplified block diagram of the receiver portion of a wireless transceiver 450. In contrast to the wireless transceiver 150 illustrated in FIG. 1, which had two receive antennas, wireless transceiver 450 includes only a single receive antenna. Of course, those skilled in the art will appreciate that one or more additional receive antennas may be used in other embodiments. In any event, the receive antenna of wireless transceiver 450 provides the received signal to duplexing circuit 452, which in turn provides the received signal to receiver front-end circuit 456. As discussed above with respect to FIG. 1, those skilled in the art will appreciate that duplexer circuit 452 may comprise one or more filters and/or switches, depending on the wireless standard, and serves to alternately connect the antenna to the receiver (RX) front-end circuit 456 and a transmitter (TX) analog section, or to isolate signals generated by the transmitter section from the RX front-end circuit 456, or both. As pictured, RX front-end circuit 456 includes a low-noise amplifier and in-phase and quadrature mixers, driven by in-phase and quadrature local oscillator signals from phase-locked loop circuit 458. As was discussed above with respect to FIG. 1, those skilled in the art will appreciate that the transmitter section and RX front-end circuit 456 of transceiver 450 further includes additional components that are not illustrated in FIG. 4, such as one or more power amplifiers, low-noise amplifiers, filters, mixers, modulators, analog-to-digital converters (ADCs), digital-to-analog converters (DACs), and the like, configured according to well-known techniques appropriate for the wireless standard(s) and frequency band(s) supported by wireless transceiver 450. Accordingly, further details of these circuits, which details are not necessary for an understanding of the present invention, are not provided herein.

RX front-end 456 is supplied with in-phase (0°) and quadrature (90°) reference signals from phase-locked loop (PLL) circuit 458, which in turn is driven by a reference clock oscillator 459. Again, design details for various suitable phase-locked loop circuits and reference oscillator circuits are well known to those skilled in the art, and are not provided here. Baseband signal processing circuit 460 thus receives separate in-phase (I) and quadrature (Q) components of the received signal from RX front-end circuit 456; these I and Q components may be digitized using matching analog-to-digital converters (not shown) located in RX front-end circuit 456 or baseband signal processing circuit 460. Among its other functions, baseband signal processing circuit 460 performs demodulation and decoding processes according to conventional techniques, which may include single-antenna interference cancellation (SAIC) techniques that treat the I and Q components of the received signal as though they come from two different antenna elements.

In the processes described in detail above, the temporal (block) correlation of the received signal was exploited to derive an estimate of the receiver frequency offset. As will be shown in detail below, other embodiments of the present invention, including, but not limited to, single-antenna receiver structures such as that pictured in FIG. 4, may exploit the spatial correlation between the in-phase and quadrature components of the received signal, as well as temporal correlations, to estimate the frequency offset. As those skilled in the art will appreciate, the below derivation of formulations for the temporal/spatial covariance and the estimated frequency offset is very similar to that described in detail above. The main difference is that the real and imaginary parts of a complex-signal are treated as a two-dimensional, real-valued vector signal.

By stacking the real and imaginary part of each signal branch $r_{c,j}[n]$ into a 2-by-1 vector, the signal model of Equation (1) can be expressed as:

$$r[n] = (I_{N_r} \otimes \Phi_{\alpha_0(n-n_0)})\{u[n] + v[n]\}, \quad (31)$$

for $n=0, 1, \ldots, N-1$, where $I_{N_r}$ denotes $N_r \times N_r$ identity matrix, $\otimes$ denotes the Kronecker product, and where $$\Phi_\theta = \begin{bmatrix} \cos\theta & -\sin\theta \\ \sin\theta & \cos\theta \end{bmatrix}. \quad (32)$$

Accordingly, r[n] denotes a real-valued, multi-branch, received signal vector with dimension $2N_r$, u[n] denotes the corresponding real-valued desired signal, and v[n] denotes a corresponding real-valued interference-plus-noise process.

Now, let $r[n,\alpha]$ denote the received signal vector de-rotated by a frequency offset α, i.e.:

$$r[n,\alpha] \equiv (I_N \otimes \Phi_{\alpha(n-n_0)}^T) r[n]. \quad (33)$$

Also, let $$r_M[n,\alpha] \equiv \text{vec}([r[n,\alpha], r[n-1,\alpha], \ldots r[n-M,\alpha]]) \quad (33)$$

be the vector formed by stacking $\{r[k,\alpha]\}_{k=n-M}^{n}$ in columns, where M denotes the "model order", and, using MATLAB notation, $\text{vec}(A) \equiv A(:)$ for any matrix A. Similarly, let $$r_M[n] \equiv \text{vec}([r[n], r[n-1], \ldots r[n-M]]) \quad (34)$$

be a vector formed by stacking $\{r[k]\}_{k=n-M}^{n}$ in columns; let $$v_M[n] \equiv \text{vec}([v[n], v[n-1,], \ldots v[n-M]]) \quad (35)$$

denote the corresponding stacked noise vector; and let $$u_M[n] \equiv vec([u[n], u[n-1], \ldots, u[n-M]]) \qquad (36)$$

denote the corresponding stacked training vector.

As in the earlier case, we assume that the de-rotated received signal vector $r_M[n,\alpha]$ has a real-valued Gaussian distribution with a mean of zero and a (spatial) covariance matrix $Q \equiv E\{r_M[n,\alpha] r_M[n,\alpha]^H\}$. Given these assumptions, then the maximum-likelihood joint estimate of the frequency offset $\alpha$ and the spatial covariance matrix Q can be computed. In other words, an iterative process can be used to find:

$$(\hat{\alpha}_{ML}, \hat{Q}_{ML}) \equiv \underset{(\alpha,Q)}{\operatorname{argmax}} ll(\alpha, Q), \qquad (37)$$

where $$ll(\alpha, Q) \equiv -(N-M)\log\det Q - \sum_{n=L+M}^{N-1} r_M[n, \alpha]^T Q^{-1} r_M[n, \alpha] \qquad (38)$$

$$= -(N-M)\log\det Q - tr\left\{Q^{-1} \sum_{n=M}^{N-1} r_m[n, \alpha] r_M[n, \alpha]^T\right\}$$

is the log-likelihood function of $\alpha$ and Q, given the stacked received signal vectors $\{r_M[n]\}_{n=M}^{N-1}$ for the burst of N samples.

From Equation (38), it can be shown that the best Q for any given $\alpha$ is given by:

$$\hat{Q}(\alpha) \equiv \underset{Q}{\operatorname{argmin}} ll(\alpha, Q) = \frac{1}{N-M} \sum_{n=M}^{N-1} r_M[n, \alpha] r_M[n, \alpha]^T. \qquad (39)$$

For any given Q, if F(Q) denote a square-root matrix of the inverse of Q such that $Q^{-1} = F(Q)^H F(Q)$, then the best $\alpha$ for the given Q reduces to:

$$\hat{\alpha}(Q) \equiv \underset{\alpha}{\operatorname{argmin}} \sum_{n=L+M}^{N-1} \|F(Q) r_M[n, \alpha]\|^2, \qquad (40)$$

which must satisfy:

$$\sum_{n=M}^{N-1} Re\left\{[F(Q) r_M[n, \alpha]]^H F(Q) \frac{\partial r_M[n, \alpha]}{\partial \alpha}\right\}\bigg|_{\alpha=\hat{\alpha}(Q)} = 0, \qquad (41)$$

where $$\frac{\partial r_M[n, \alpha]}{\partial \alpha} = \qquad (42)$$

$$blkdiag\left(\{I_{N_r} \otimes (n-k-n_0)\Phi_{\alpha(n-k-n_0)}^T J\}_{k=0}^{M}\right) r_M[n]$$

where $J \equiv \begin{pmatrix} 0 & -1 \\ 1 & 0 \end{pmatrix}$ and $blkdiag(\{A_k\}_{k=0}^{M})$ denotes a block diagonal matrix with matrices $\{A_k\}_{k=0}^{M}$ on its diagonal.

The solution of Equation (42) as a function of $\alpha$ does not have closed form expression in general. However, since the frequency offset in Hertz is typically much smaller than the baud rate, then the relative frequency offset $\alpha$ is small and the rotational matrix $\Phi_\theta$ can be well approximated by the first few terms of its Taylor series expansion given by $$\Phi_\theta = I + \theta J - \frac{\theta^2}{2} I + \ldots \qquad (43)$$

Using only the first two terms of Equation (43) (i.e., a linear approximation of $\Phi_\theta$), then:

$$r_M[n, \alpha] \cong r_M[n] - \alpha(K_{n-M}^n \otimes I_{N_r} \otimes J) r_M[n], \qquad (44)$$

and $$\frac{\partial r_M[n, \alpha]}{\partial \alpha} \cong [K_{n-M}^n \otimes I_{N_r} \otimes J + \alpha(K_{n-M}^n)^2 \otimes I_{2N_r}] r_M[n], \qquad (45)$$

where $$K_{n-M}^n \equiv \begin{pmatrix} n-n_0 & 0 & \cdots & 0 \\ 0 & n-1-n_0 & \ddots & \vdots \\ \vdots & \ddots & \ddots & 0 \\ 0 & \cdots & 0 & n-M-n_0 \end{pmatrix}. \qquad (46)$$

If $x_M[n] = (K_{n-M}^n \otimes I_{N_r} \otimes J) r_M[n]$ and $z_M[n] = ((K_{n-M}^n)^2 \otimes I_{2N_r}) r_M[n]$, then it follows that the necessary condition in Equation (42) reduces to:

$$\hat{\alpha}(Q)^2 \langle x_M[n], z_M[n]\rangle_{Q^{-1}} + \hat{\alpha}(Q)[\|x_M[n]\|_{Q^{-1}}^2 - \langle x_M[n], z_M[n]\rangle_{Q^{-1}}] - \langle r_M[n], x_M[n]\rangle_{Q^{-1}} \cong 0, \qquad (47)$$

where $$\langle a[n], b[n]\rangle_{Q^{-1}} \equiv \sum_{n=L+M}^{N-1} a[n]^H F(Q)^H F(Q) b[n] \qquad (48)$$

$$= \sum_{n=L+M}^{N-1} a[n]^H Q^{-1} b[n]$$

and $$\|a[n]\|_{Q^{-1}}^2 \equiv \langle a[n], a[n]\rangle_{Q^{-1}}.$$

Solving Equation (47) yields the best estimate of the frequency offset for a given covariance Q:

$$\hat{\alpha}(Q) \cong \frac{\langle x_M[n], z_M[n]\rangle_{Q^{-1}}}{2\langle x_M[n], z_M[n]\rangle_{Q^{-1}}} \left[\sqrt{1 + \frac{4\langle x_M[n], z_M[n]\rangle_{Q^{-1}} \langle r_M[n], x_M[n]\rangle_{Q^{-1}}}{\left(\frac{\|x_M[n]\|_{Q^{-1}}^2 -}{\langle x_M[n], z_M[n]\rangle_{Q^{-1}}}\right)^2}} - 1\right]. \qquad (49)$$

(Note that the other root of Equation (47) violates the assumption of small $\alpha$.)

Using the approximation $\sqrt{1+x} \approx 1 + (\frac{1}{2})x$, Equation (49) simplifies to $$\hat{\alpha}(Q) \cong \frac{\langle r_M[n], x_M[n]\rangle_{Q^{-1}}}{\langle x_M[n], z_M[n]\rangle_{Q^{-1}}}. \qquad (50)$$

Those skilled in the art will readily appreciate that the formulation in Equation (39) which provides the best Q for any given $\alpha$, may be used along with either Equation (49) or (50), which provide the best $\alpha$ for a given Q, in an iterative manner, to compute an approximate maximum-likelihood estimate of the frequency offset. This approach is generally the same as discussed above in connection with FIG. 3, except that it is this time based on the alternative formulations discussed immediately above.

Accordingly, a spatially and temporally stacked signal block is formed according to:

$$r_M[n] = \text{vec}(r[n], r[n-1], \ldots, r[n-M]), \quad (51)$$

and a de-rotated received signal block computed according to:

$$r_M[n, \hat{\alpha}^{(i)}] = \text{blkdiag}(I_{N_r} \otimes \Phi^{(i)}{}_{(n-n_0)}{}^T, I_{N_r} \otimes \Phi^{(i)}{}_{(n-1-n_0)}{}^T, \ldots, I_{N_r} \otimes \Phi^{(i)}{}_{(n-M-n_0)}) T_M[n]. \quad (52)$$

Given an initial estimate of the receiver frequency offset, then an estimate of the signal covariance matrix is computed:

$$\hat{Q}^{(i)} = \frac{1}{N-L-M} \sum_{n=L+M}^{N-1} r_M[n, \hat{\alpha}^{(i)}] r_M[n, \hat{\alpha}^{(i)}]^T, \quad (53)$$

and the receiver frequency-offset estimate updated according to:

$$\hat{\alpha}^{(i+1)} = \frac{\langle r_M[n], x_M[n] \rangle_{(\hat{Q}^{(i)})^{-1}}}{\langle x_M[n], z_M[n] \rangle_{(\hat{Q}^{(i)})^{-1}}} \quad (54)$$

or $$\hat{\alpha}^{(i+1)} = \quad (55)$$

$$\frac{\|x_M[n]\|^2_{(\hat{Q}^{(i)})^{-1}} - \langle x_M[n], z_M[n] \rangle_{(\hat{Q}^{(i)})^{-1}}}{2\langle x_M[n], z_M[n] \rangle_{(\hat{Q}^{(i)})^{-1}}} \left[ 1 + \sqrt{\frac{4\langle x_M[n], z_M[n] \rangle_{(\hat{Q}^{(i)})^{-1}} \langle r_M[n], x_M[n] \rangle_{(\hat{Q}^{(i)})^{-1}}}{\left(\frac{\|x_M[n]\|^2_{(\hat{Q}^{(i)})^{-1}} - }{\langle x_M[n], z_M[n] \rangle_{(\hat{Q}^{(i)})^{-1}}}\right)^2}} - 1 \right],$$

where $$x_M[n] = (K^n_{n-M} \otimes I_{N_r} \otimes J) r_M[n] \quad (56)$$

and $$z_M[n] = ((K^n_{n-M})^2 \otimes I_{2N_r}) r_M[n]. \quad (57)$$

As was described above, this estimation process may be repeated until a pre-determined stopping criterion is satisfied, such as the completion of a maximum number of iterations, or convergence of the estimates to a point at which the incremental change in the log-likelihood of the estimates is smaller than a pre-determined threshold).

Those skilled in the art will appreciate that an advantage of the techniques described above is to that a receiver can compute an estimate of the frequency offset of the received signal without using any training signal or running computationally intensive equalization or demodulation algorithms. This allows a mobile terminal to periodically compute frequency-offset estimates even when there is neither training signal nor data-bearing signal transmitted to it. Of course, in some embodiments these techniques may be used in a receiver along with prior techniques that depend on training signals and/or demodulated signals. In some embodiments, the techniques described above may be selectively employed depending on whether training signals and/or demodulated signals are available.

With these and other variations and extensions in mind, those skilled in the art will appreciate that the preceding descriptions of various embodiments of methods and apparatus estimating receiver frequency offset in a communications receiver are given for purposes of illustration and example. As suggested above, one or more of the techniques discussed above, including the process flows illustrated in FIGS. 2 and 3, may be carried out in a wireless receiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for estimating receiver frequency offset in a communications receiver. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of estimating receiver frequency offset in a communications receiver, the method comprising the steps of:
   forming, in a baseband signal processing circuit, a temporally stacked signal block from multi-branch signal samples corresponding to each of two or more time-separated samples of a received signal; and
   computing in a frequency offset estimation circuit of the baseband signal processing circuit, a maximum-likelihood joint estimate of the receiver frequency offset and a spatial covariance of the temporally stacked signal block de-rotated by the receiver frequency offset.

2. The method of claim 1, wherein the temporally stacked signal block comprises a vector formed by stacking complex-valued samples for each branch of the multi-branch signal samples.

3. The method of claim 1, wherein the temporally stacked signal block comprises a vector formed by stacking real-valued in-phase and quadrature samples for each branch of the two or more multi-branch signal samples.

4. The method of claim 1, wherein computing a maximum-likelihood joint estimate of the receiver frequency offset and the spatial covariance of the temporally stacked signal block de-rotated by the receiver frequency offset comprises, for each of two or more iterations:
   computing a de-rotated received signal block from the temporally stacked signal block, using a current estimate of the receiver frequency offset;
   estimating a signal covariance matrix from the de-rotated received signal block; and
   updating the current estimate of the receiver frequency offset as a function of the estimated signal covariance matrix.

5. The method of claim 4, wherein the two or more iterations comprise an initial iteration for which the current estimate of the receiver frequency offset is initialized to one of:
   zero;
   a coarse frequency offset obtained from a coarse frequency-offset estimation process; and
   a prior maximum-likelihood estimate of receiver frequency offset.

6. The method of claim 4, further comprising iteratively updating the current estimate of the receiver frequency offset for a pre-determined maximum number of iterations.

7. The method of claim 4, further comprising computing a log-likelihood of the joint estimate of the receiver frequency offset and the spatial covariance, for each iteration, and iteratively updating the current estimate of the receiver frequency offset until the incremental change in the computed log-likelihoods between successive iterations falls below a pre-determined threshold.

8. A wireless communications receiver, comprising:
a baseband signal processing circuit configured to form a temporally stacked signal block from multi-branch signal samples corresponding to each of two or more time-separated samples of a received signal; and
a frequency offset estimation circuit of the baseband signal processing circuit configured to compute a maximum-likelihood joint estimate of the receiver frequency offset and a spatial covariance of the temporally stacked signal block de-rotated by the receiver frequency offset.

9. The wireless communications receiver of claim 8, wherein the temporally stacked signal block formed by the baseband signal processing circuit comprises a vector formed by stacking complex-valued samples for each branch of the multi-branch signal samples.

10. The wireless communications receiver of claim 8, wherein the temporally stacked signal block formed by the baseband signal processing circuit comprises a vector formed by stacking real-valued in-phase and quadrature samples for each branch of the two or more multi-branch signal samples.

11. The wireless communications receiver of claim 8, wherein the frequency offset estimation circuit of the baseband signal processing circuit is configured to:
compute the maximum-likelihood joint estimate of the receiver frequency offset and the spatial covariance of the temporally stacked signal block de-rotated by the receiver frequency offset by, for each of two or more iterations:
computing a de-rotated received signal block from the temporally stacked signal block, using a current estimate of the receiver frequency offset;
estimating a signal covariance matrix from the de-rotated received signal block; and
updating the current estimate of the receiver frequency offset as a function of the estimated signal covariance matrix.

12. The wireless communications receiver of claim 11, wherein the two or more iterations comprise an initial iteration and wherein the frequency offset estimation circuit of the baseband signal processing circuit is configured to initialize the current estimate of the receiver frequency offset for the initial iteration to one of:
zero;
a coarse frequency offset obtained from a coarse frequency-offset estimation process; and
a prior maximum-likelihood estimate of receiver frequency offset.

13. The wireless communications receiver of claim 11, wherein the frequency offset estimation circuit of the baseband signal processing circuit is further configured to iteratively update the current estimate of the receiver frequency offset for a pre-determined maximum number of iterations.

14. The wireless communications receiver of claim 11, wherein the frequency offset estimation circuit of the baseband signal processing circuit is further configured to compute a log-likelihood of the joint estimate of the receiver frequency offset and the spatial covariance, for each iteration, and to iteratively update the current estimate of the receiver frequency offset until an incremental change in the computed log-likelihoods between successive iterations falls below a pre-determined threshold.

* * * * *

UNITED STATES PATENT AND TRADEMARK OFFICE
CERTIFICATE OF CORRECTION

PATENT NO. : 8,189,720 B2
APPLICATION NO. : 12/275992
DATED : May 29, 2012
INVENTOR(S) : Hui

It is certified that error appears in the above-identified patent and that said Letters Patent is hereby corrected as shown below:

In Column 5, Line 40, delete "$r_{cj}[n]$" and insert -- $r_{c,i}[n]$ --, therefor.

In Column 5, Line 48, in Equation (2), delete "$r[n,\alpha] = e^{-j\alpha(n-n_0)} r_c[n]$," and insert -- $r[n,\alpha] \equiv e^{-j\alpha(n-n_0)} r_c[n]$ --, therefor.

In Column 5, Line 58, in Equation (5), delete "$v_M[n] \equiv vec([v_c[n], v_c[n-1], \ldots, v_c[n-M]])$," and insert -- $v_M[n] \equiv vec([v_c[n], v_c[n-1], \ldots, v_c[n-M]])$ --, therefor.

In Column 5, Line 61, in Equation (6), delete "$u_M[n] \equiv vec([u_c[n], u_c[n-1], \ldots, u_c[n-M]])$," and insert -- $u_M[n] \equiv vec([u_c[n], u_c[n-1], \ldots, u_c[n-M]])$ --, therefor.

In Column 6, Line 41, delete "a for" and insert -- $\alpha$ for --, therefor.

In Column 6, Line 46, in Equation (11), delete "$r_m$" and insert -- $r_M$ --, therefor.

In Column 6, Line 54, in Equation (12), delete "$\alpha = \overline{\alpha}(Q)$," and insert -- $\alpha = \hat{\alpha}(Q)$ --, therefor.

In Column 8, Lines 42-43, in Equation (25), delete "$r_M[n, \hat{\alpha}^{(i)}] = [diag(e^{-\hat{\alpha}^{(i)}(n-n_0)}, e^{-\hat{\alpha}^{(i)}(n-1-n_0)}, \ldots, e^{-\hat{\alpha}^{(i)}(n-M-n_0)}) \otimes I_{N_s}] r_M[n].$" and insert -- $r_M[n, \hat{\alpha}^{(i)}] = [diag(e^{-\hat{\alpha}^{(i)}(n-n_0)}, e^{-\hat{\alpha}^{(i)}(n-1-n_0)}, \ldots, e^{-\hat{\alpha}^{(i)}(n-M-n_0)}) \otimes I_{N_s}] r_M[n].$ --, therefor.

Signed and Sealed this
Twenty-third Day of October, 2012

David J. Kappos
*Director of the United States Patent and Trademark Office*

CERTIFICATE OF CORRECTION (continued)
U.S. Pat. No. 8,189,720 B2

In Column 10, Line 58, in Equation (33), delete "$r[n,\alpha] = (I_{N_r} \otimes \Phi_{\alpha(n-n_0)}^T)r[n]$." and insert -- $\mathbf{r}[n,\alpha] \equiv (\mathbf{I}_{N_r} \otimes \Phi_{\alpha(n-n_0)}^T)\mathbf{r}[n]$. --, therefor.

In Column 10, Line 67, in Equation (35), delete "$v_M[n] \equiv \text{vec}([v[n],v[n-1],\ldots v[n-M]])$" and insert -- $v_M[n] \equiv \text{vec}([v[n],v[n-1],\ldots v[n-M]])$ --, therefor.

In Column 11, Line 3, in Equation (36), delete "$u_M[n] \equiv \text{vec}([u[n],u[n-1],\ldots,u[n-M]])$" and insert -- $u_M[n] \equiv \text{vec}([u[n],u[n-1],\ldots,u[n-M]])$ --, therefor.

In Column 11, Line 27, delete "$\{r_M[n]\}_{n=M}^{N-1}$" and insert -- $\{\mathbf{r}_M[n]\}_{n=M}^{N-1}$ --, therefor.

In Column 13, Lines 11-12, in Equation (52), delete "$r_M[n,\hat{\alpha}^{(i)}] = \text{blkdiag}(I_{N_r} \otimes \Phi^{(i)}{}_{(n-n_0)}^T, I_{N_r} \otimes \Phi^{(i)}{}_{(n-1-n_0)}^T, \ldots, I_{N_r} \otimes \Phi^{(i)}{}_{(n-M-n_0)}) T_M[n].$" and insert -- $r_M[n,\hat{\alpha}^{(i)}] = \text{blkdiag}(I_{N_r} \otimes \Phi_{\hat{\alpha}^{(i)}(n-n_0)}^T, I_{N_r} \otimes \Phi_{\hat{\alpha}^{(i)}(n-1-n_0)}^T, \ldots, I_{N_r} \otimes \Phi_{\hat{\alpha}^{(i)}(n-M-n_0)}^T) \mathbf{r}_M[n].$ --, therefor.

In Column 13, Line 50, delete "threshold)." and insert -- threshold. --, therefor.